United States Patent [19]
Haynes

[11] 3,811,536
[45] May 21, 1974

[54] CHOCK

[76] Inventor: Freddie J. Haynes, 3612 Meadowbrook, Midwest City, Okla.

[22] Filed: July 24, 1972

[21] Appl. No.: 274,176

[52] U.S. Cl. .............................................. 188/32
[51] Int. Cl. ............................................ B60t 3/00
[58] Field of Search ................... 188/4 R, 32, 36

[56] References Cited
UNITED STATES PATENTS

| | | | |
|---|---|---|---|
| 2,475,111 | 7/1949 | Ridland | 188/32 |
| 3,258,088 | 6/1966 | Bowen | 188/32 |
| 2,461,248 | 2/1949 | Wright | 188/32 |
| 2,797,774 | 7/1957 | Eckhart | 188/32 |
| 2,822,063 | 2/1958 | Hampton | 188/32 |

Primary Examiner—Duane A. Reger
Attorney, Agent, or Firm—Jerry J. Dunlap

[57] ABSTRACT

A chock for aircraft or other vehicles having ground engaging wheels, including a pair of adjustably engaging chock halves defining a generally U-shaped chock. Each of the chock halves is made of a strong, relatively lightweight synthetic resin, and is of generally triangular cross sectional configuration. Each chock half is of L-shaped configuration and includes an arm configured to register with a corresponding arm of the other chock half when the chock halves are slidably engaged. A securing member is provided for locking the two halves of the chock in a selected position when the chock is in position for brakingly engaging the opposite sides of a tire or wheel.

11 Claims, 4 Drawing Figures

PATENTED MAY 21 1974 3,811,536

CHOCK

BACKGROUND OF THE INVENTION

1. Field of the Invention

This invention relates to chocks for arresting movement of vehicles along the ground, and more particularly, to aircraft chocks used for chocking the wheels of aircraft.

2. Brief Description of the Prior Art

A number of types of chocks for chocking the wheels of aircraft have heretofore been provided. Devices used for this function range in sophistication from unfinished, crudely fitting wooden blocks to specially configured metal plates. Certain difficulties of use, and disadvantages in use, have characterized most of the types of chocks which have been heretofore provided. Thus, for example, it is frequently difficult to locate chocks at certain commercial or private airports for ready usage in chocking the aircraft. Also, some of the chocks which have been provided are heavy and are difficult to move from one location to another, and to easily slide in place against the wheels of the aircraft.

A major problem which has not been optimally solved by the chock constructions which have been previously employed is that of secure retention of the parked aircraft in one location at times when high winds are impinging on the airplane. In this circumstance, the aircraft may tend to yaw or fishtail, working the chocks loose from their position of securement or, in some instances, overcoming the frictional resistance of the chock to sliding movement on the ground, with the result that both the aircraft and the chock are caused to slide along the parking surface.

Another problem which has been experienced in some instances is the inability of chocks of a given size to be used for varying sizes of wheels due to the contouring or configuration of the chocks to fit a particular tire size and shape. Moreover, for the most effective chocking of the wheels. it is usually necessary to use a pair of chocks disposed on opposite sides of the tire and on occasion, the necessary number of chocks to accomplish this fore and aft chocking of all wheels is not available or, at least, cannot be readily located.

BRIEF DESCRIPTION OF THE PRESENT INVENTION

The present invention is a relatively lightweight, easily utilized chock which can be employed for chocking ground engaging wheels of substantially any size, and which provides, as an integral part thereof, both fore and aft chocking surfaces for engagement with opposite sides of the tire. As a secondary usage, the chock of the invention can also be employed to provide traction surfaces which may be placed in position to permit an automobile or other vehicle mired in mud or sand to be easily extricated therefrom.

Broadly described, the present invention comprises a pair of adjustably engaged chock halves, each of which is of generally L-shaped configuration and which form, when joined together for usage, a generally U-shaped chock. The two chock halves are substantially complementary in configuration and each is of a generally V-shaped cross sectional configuration. One of the chock halves includes a leg which nests within a corresponding leg of the other chock half, with the two legs being slidably engaged to facilitate the lengthening or shortening of the bight or web portion of the U-shaped chock formed by the two chock halves when joined together. A suitable securing member is provided in association with the two chock halves so that relative movement between the two chock halves can be prevented after they have been selectively adjusted in their positions in relation to each other to provide a chock of the size required for the particular vehicle with which it is to be used.

It is an object of the present invention to provide an improved chock structure which is especially useful in the chocking of the wheels of aircraft, but which also can be used with other vehicles having ground engaging wheels.

A further object of the invention is to provide an adjustable wheel chock which includes parts for engaging the wheel at points ahead of and behind the point of contact of the wheel with the ground so as to prevent forward or rearward movement of the vehicle.

Another object of the invention is to provide a two part, adjustably sized chock which can be selectively dimensioned to wedgingly engage the wheel of the particular vehicle upon which the chock is to be used.

A further object of the invention is to provide an adjustable chock for an aircraft, which chock is of lightweight and low storage bulk or volume, but which is mechanically strong and able to withstand high crushing or compressive loads.

An additional object of the present invention is to provide an aircraft chock which is made of a material and is made of a configuration such that the gripping or frictional engagement of a chock with a concrete or other surface is enhanced and increased by any tendency of the aircraft to move relative to the chock when the chock is engaged with the wheels of the aircraft.

Additional objects and advantages of the invention will become apparent as the following detailed description of a preferred embodiment of the invention is read in conjunction with the accompanying drawings which illustrate the invention.

DETAILED DESCRIPTION OF A PREFERRED EMBODIMENT OF THE INVENTION

Figure 1:
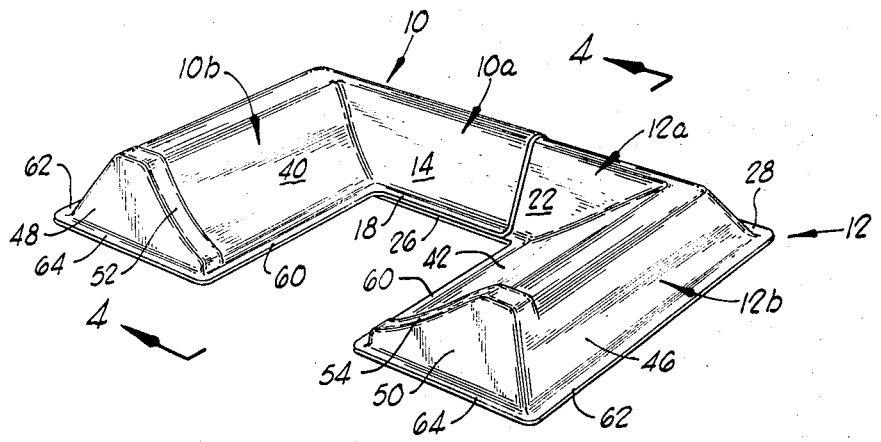
FIG. 1 is a perspective view of one embodiment of an aircraft chock constructed in accordance with the present invention.
Figure 2:
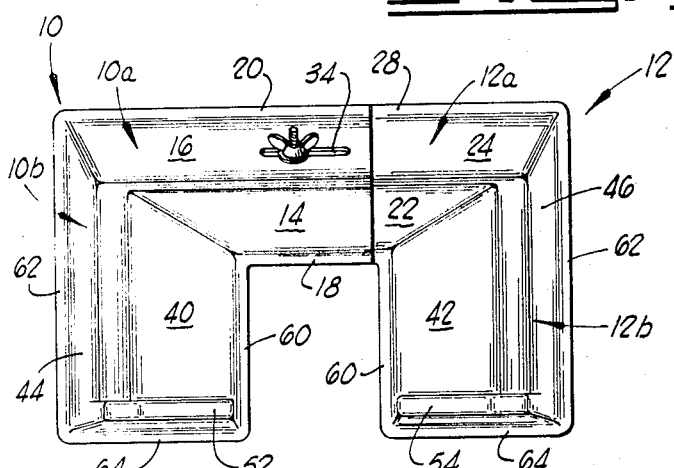
FIG. 2 is a plan view of the aircraft chock shown in FIG. 1.
Figure 3:
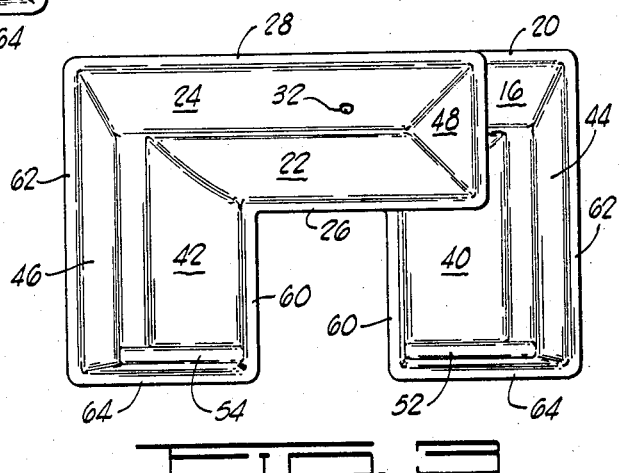
FIG. 3 is a bottom view of the aircraft chock of the invention.
Figure 4:
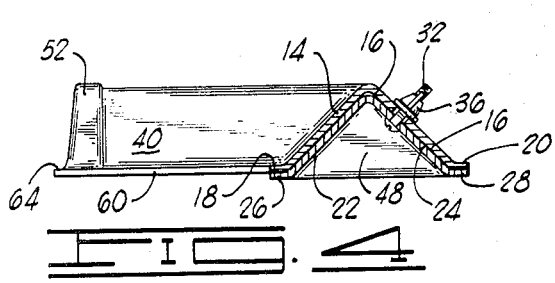
FIG. 4 is a sectional view taken along line 4—4 of FIG. 3.

Referring initially to FIG. 1 of the drawings, the aircraft chock of the invention is there shown and includes a pair of chock halves, designated generally by reference numerals 10 and 12. For convenience of reference, the chock half 10 will be hereinafter referred to the female thefemale chock half and the chock half 12 will be referred to as the male chock half. It will be noted that each of the chock halves 10 and 12 is of generally L-shaped configuration and that the female chock half 10 includes legs 10a and 10b, and the male chock half 12 includes legs 12a and 12b. The chock halves are joined together by the nesting or mating arrangement of the legs 10a and 12a of each of the chock halves, and these legs slidingly engage each other so that the web or bight portion of the U-shaped chock may be lengthened or shortened in a way and for a purpose hereinafter described. It will be noted in referring to the sectional view appearing in FIG. 4 that each of the chock halves 10 and 12 is of generally V-shaped cross-sectional configuration.

The leg 10a of the female chock half 10 includes a pair of converging side walls 14 and 16 which are joined together at the top edges thereof. The leg 10a further includes a pair of substantially horizontally extending friction flanges 18 and 20 which extend from the free edges of the side walls 14 and 16. In similar fashion, the leg 12a of the male chock half includes side walls 22 and 24 which are inclined with respect to the vertical and converge to a line of joinder at the upper edges thereof. The lower free edges of the side walls 22 and 24 have formed integrally therewith, a pair of horizontally extending friction flanges 26 and 28. A closure plate 30 closes one end of the leg 12a of the male chock half 12 and extends between the side walls 22 and 24.

For the purpose of slidably and adjustably engaging the legs 10a and 12a of the female chock half 10 and male chock half 12, respectively, the side wall 24 of the leg 12a has projecting therefrom, a threaded stud or bolt 32 which projects substantially normal to the plane of the side wall 24. The bolt passes through a registering, elongated slot 34 formed in the side wall 16 of the leg 10a of the female chock half 10. The slot 34 extends substantially parallel to the line of joinder of the side walls 14 and 16 at the upper edges thereof, and it will be perceived that the legs 10a and 12a may be slid in a longitudinal direction with respect to each other by reason of the ability of the bolt 32 to slide in the slot 34. A suitable nut 36 is threaded on the bolt 32 so that, when the desired relative positions of the chock halves 10 and 12 is attained, they may be locked in this position by tightening the nut.

As will be perceived in referring to FIG. 1, the legs 10b and 12b of the female and male chock halves, respectively, each have a tire supporting side wall 40 and 42, respectively, which slopes downwardly and inwardly. Each of the tire supporting side walls 40 and 42 is arcuately shaped to provide a slight concavity of increasing vertical steepness in the direction of the upper edge of this side wall. The upper edge of each of the tire supporting side walls 40 and 42 is secured to, or formed integrally with, the upper edge portion of divergent side walls 44 and 46 which complete the generally triangular cross sectional configuration of each of the legs 10b and 12b. The ends of the legs 10b and 12b opposite the end thereof connected to the respective legs 10a and 12a are closed by means of triangular closure plates 48 and 50. Gripping and retaining ribs 52 and 54 project upwardly from the surface of the tire supporting side walls 40 and 42 at their intersection with the closure plates 48 and 50 and function in a manner hereinafter described. Horizintally extending friction flanges 60 and 62 project in opposite directions from the lower edges of each of the respective tire supporting side walls 40 and 42 and side walls 44 and 46 of the legs 10a and 10b, respectively. A horizontally extending friction flange 64 also extends from each of the closure plates 48 and 50.

In the use of the aircraft chock of the invention, the chock halves 10 and 12 are first slidingly diverged from each other after the nut 36 has been loosened to permit relative movement between the legs 10a and 12a. When the chock has been opened a sufficient distance, the legs 10b and 12b are placed on opposite sides of the tire of the aircraft, and the chock halves are then moved back together until the tire supporting side walls 40 and 42 come in contact with opposite sides of the tire. The nut 36 is then tightened upon the threaded bolt 32 to lock the legs 10a and 12a of the chock halves 10 and 12 against sliding movement relative to each other. In positioning the chock in the manner described, the gripping and retaining ribs 52 and 54 are placed adjacent the inside wall of the tire, and the legs 10a and 12a extend along the outside wall of the tire. In this way, yawing of the tire or side-slipping under the displacement force of high winds directed against one side of the aircraft is avoided.

With the chock positioned in the manner described, any tendency of the aircraft to move forward or to the rear results in its tires (assuming both tires are chocked, as will normally be the case) will move up to the gentle incline afforded by the arcuately shaped tire supporting side walls 40 and 42. As the tire rides up on the upper surface of either of these side walls, the frictional engagement of the lower edge and under surface of each of these side walls with the underlying concrete parking surface is enhanced due to the application of the weight of the aircraft through the tire to this portion of the chock. Thus, there is an increase in the frictional engagement of the chock with the ground, and displacement or sliding movement of the chock along the ground is more strongly resisted.

As has previously been mentioned, the chocks of the invention can also be utilized to provide traction surfaces ahead of and behind an automobile wheel to facilitate the extrication of automobiles from sand and mud in which such vehicles are mired. In such usage, the chock is again placed in substantially the same position as that in which it is utilized for chocking. The vehicle may then be started and backed or moved ahead to move it from its mired position to a position in which the wheels are on terrain providing better traction. Of course, where such usage is contemplated and intended for the structure of the invention, it will be preferable to make the legs 10b and 12b of the chock halves of greater width and lesser height or thickness so that less difficulty is encountered by the wheels of the automobile in moving up and over the top of the chock.

Although a preferred embodiment of the invention has been herein described and depicted, it will be understood that various changes and innovations in the illustrated and described structure can be effected without departure from the basic principles upon which the invention is based. Changes and innovations of this type are therefore deemed to be circumscribed by the spirit and scope of the invention except as the same may be limited by the appended claims or reasonable equivalents thereof.

What is claimed is:
1. A chock comprising
   a first L-shaped chock half including
      a first leg; and
      a second leg extending normal to said first leg and having a tire supporting side wall having an arcuate, concave upper surface; and
   a second L-shaped chock half including
      a first leg mating with and slidingly engaging said first leg of said first chock half; and a second leg extending normal to said first leg of said second chock half and substantially parallel to said second leg of said first chock half whereby said chock has a generally U-shaped configuration overall, said second leg of said second chock half having a tire supporting side wall having an arcuate, concave upper surface, the concavities of said upper surfaces each being semi-cylindrical in shape, and having the arcuate curvature thereof lying in a plane extending normal to said second legs.

2. A chock as defined in claim 1 wherein each of said legs are of generally V-shaped cross-section.

3. A chock as defined in claim 1 wherein each of said first legs includes:
 a first side wall inclined at an angle to the vertical; and
 a second side wall inclined at an angle to the vertical and intersecting said first side wall at the upper edges of said first and second side walls.

4. A chock as defined in claim 1 and further characterized as including a gripping and retaining rib projecting upwardly from the upper surface of each of said tire supporting side walls and disposed at the opposite end of each of said second legs from its end joined to said first leg.

5. A chock as defined in claim 1 and further characterized as including friction flanges projecting horizontally from the lower sides of each of said legs.

6. A chock as defined in claim 2 wherein each of said second legs further includes an additional side wall inclined at an angle to the vertical and intersecting at its top edge, the top edge of said tire supporting side wall.

7. A chock as defined in claim 6 and further characterized as including a closure plate extending between each of said additional side walls and each of said tire supporting side walls; and
 friction flanges projecting horizontally from the lowermost edges of each of said additional side walls, tire supporting side walls and closure plates, said friction flanges extending in co-planar alignment with each other.

8. A chock as defined in claim 2 wherein said first leg of said first chock half nests slidingly within the first leg of said second chock half; and
 wherein said chock is further characterized in including:
  threaded fastening means secured to the first leg of said first chock half; and
  slot means in said first leg of said second chock half receiving said fastening means therethrough and accommodating relative movement between said nested first legs.

9. A chock as defined in claim 1 wherein each of said chock halves is a unitary, one piece structure of synthetic resin.

10. A chock as defined in claim 3 wherein each of said legs if of V-shaped cross-section, and said chock is further characterized as including a gripping and retaining rib projecting upwardly from the upper surface of each of said tire supporting side walls and disposed at the opposite end of each of said second legs from its end joined to said first leg.

11. A chock as defined in claim 10 and further characterized as including friction flanges projecting horizontally from the lower sides of each of said legs.

* * * * *